United States Patent Office 3,544,367
Patented Dec. 1, 1970

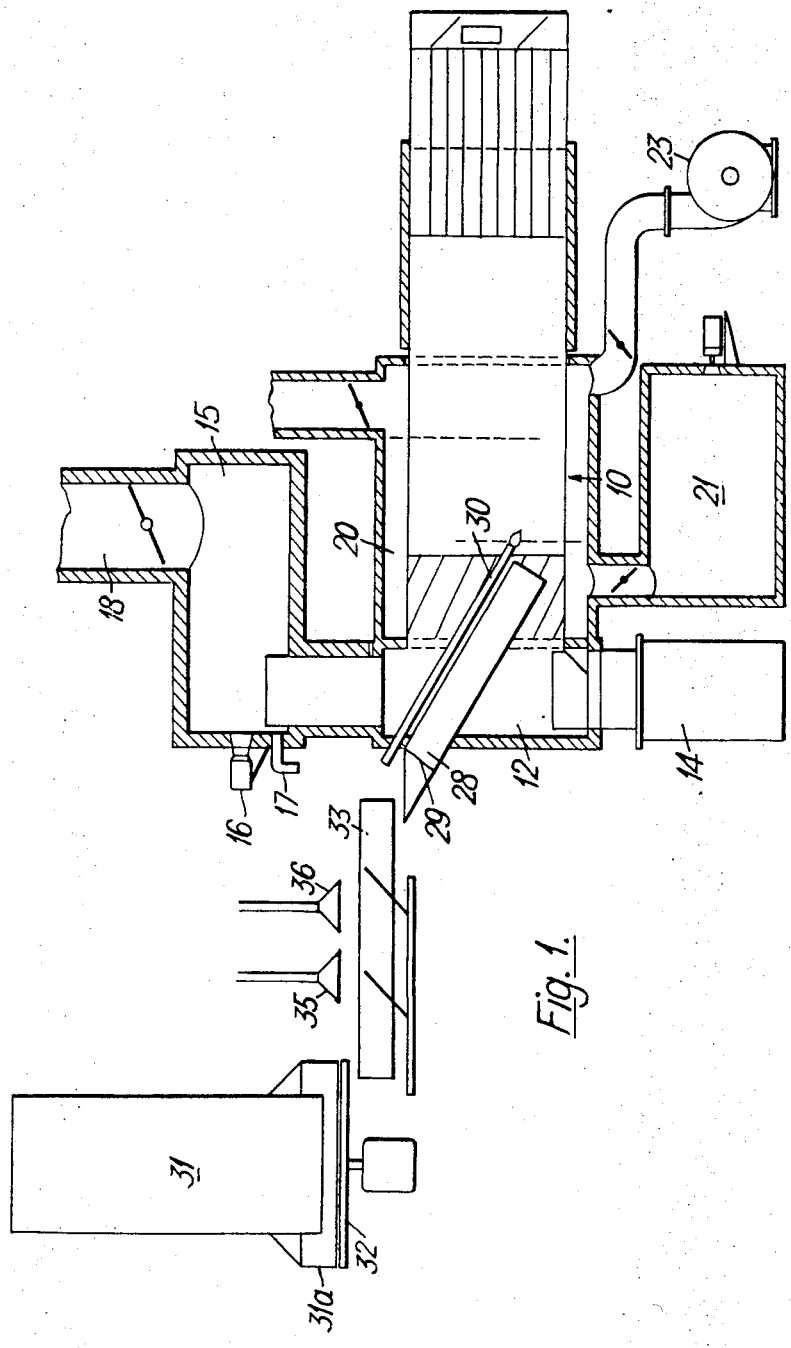

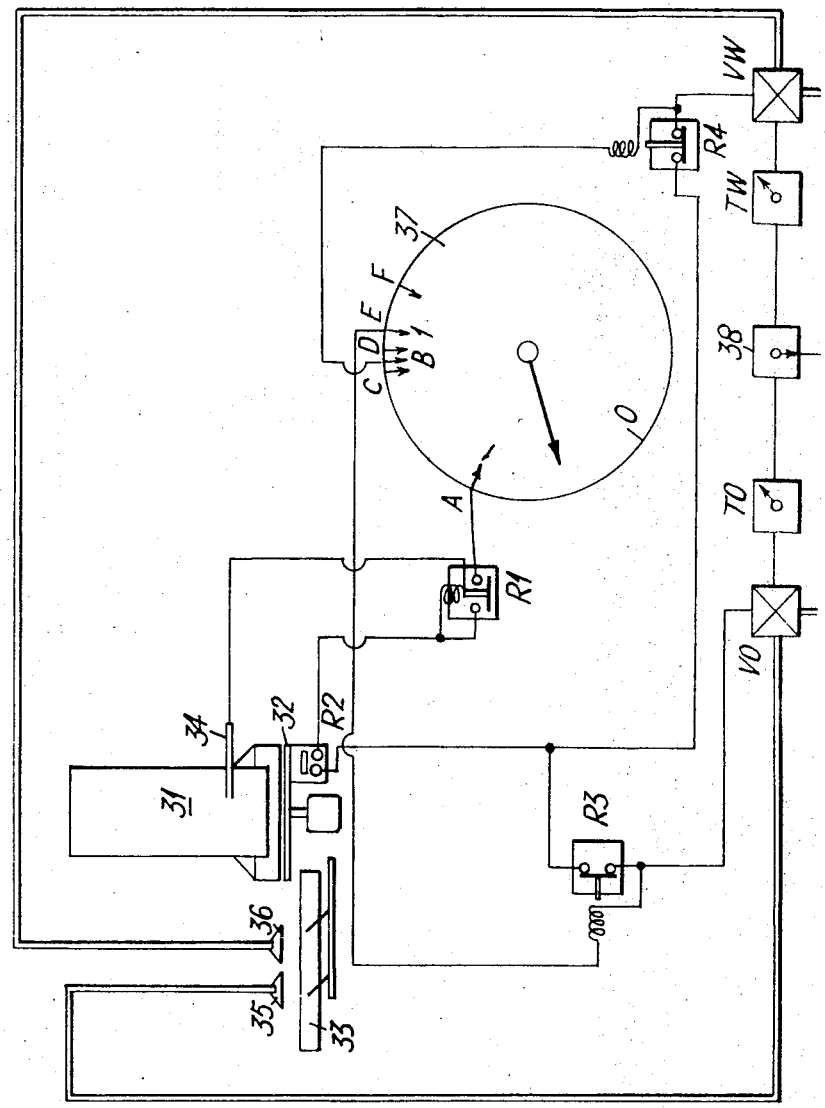

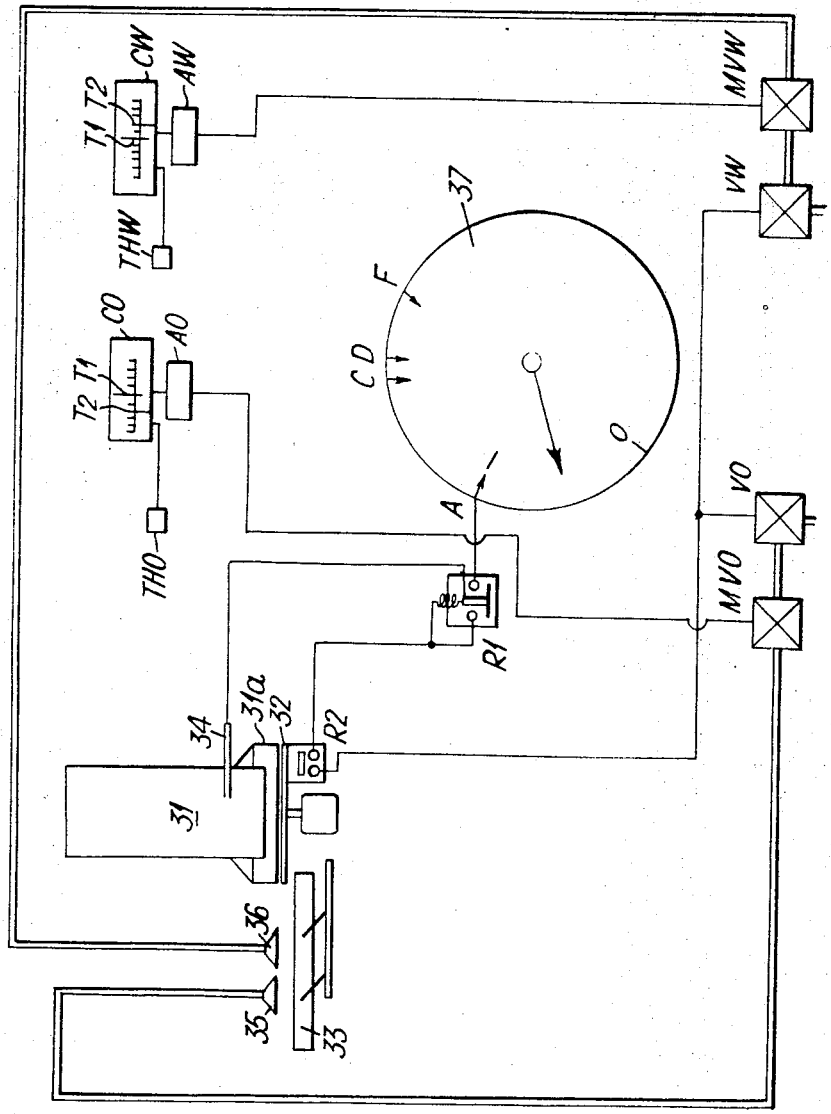

3,544,367
DRYING PLANT FOR METAL TURNINGS
Friedrich Ehrlich, Wendover, Aylesbury, and Gordon James Thomas, Butlers Cross, Aylesbury, England, assignors to International Alloys Limited
Filed June 3, 1968, Ser. No. 733,905
Claims priority, application Great Britain, June 7, 1967, 26,368/67
Int. Cl. B08b 7/00; C23g 5/00
U.S. Cl. 134—2                    8 Claims

ABSTRACT OF THE DISCLOSURE

An apparatus for, and a method of, treating metal scrap contaminated with volatile and/or combustible substances employing an oil and water spray regulated in dependence on the temperature in a combustion chamber for adding oil or water to the scrap before the scrap is fed into the combustion chamber.

---

The present invention relates to methods of and apparatus for treating metal scrap particles or the like, hereinafter referred to simply as "scrap," contaminated with volatile and/or combustible substances.

To prepare scrap, e.g. aluminium alloy swarf, for melting, it is known to remove or at least reduce contamination of the scrap by water, oil and other organic waste by feeding the scrap into a drum rotating about an axis slightly inclined in the horizontal with a burner in the drum for igniting and maintaining burning of oil vapour evaporated from the scrap. Evaporation of the water, oil and any other volatile and/or combustible substance is effected mainly by the burning of the oil. The evaporation may be controlled by a jacket extending around a part of the length of the drum and provided with means for feeding hot gas or cooling air through the jackets, air being supplied to the drum to cause at least partial combustion of any combustible substances and the resulting gases being discharged through a smoke box into an after-burner. Apparatus for treating scrap in this way is described in our prior British patent specification No. 944,623.

If the proportion of oil or other organic waste in the scrap is low compared with the water content, it may be necessary to provide a large amount of additional indirect heat through the jacket, and the throughput of scrap will depend on the indirect heat input, required mainly for evaporating the water. The scrap throughput may therefore become low and the fuel consumption for the indirect heating will be high, which will be aggravated by higher heat losses resulting from higher operating temperature.

On the other hand, if the proportion of oil or other organic waste is high and the water content is low, overheating of the drum and smoke box may occur unless the rate of charging of the drum is increased. However, increasing the rate of charging also increases the amount of combustible fumes given off by the scrap, which may result in excessive temperatures in the after-burner.

The present invention provides apparatus for treating metal scrap contaminated with volatile and/or combustible substances comprising means for feeding the contaminated scrap to means for effecting at least partial combustion of any combustible substances, the feeding means being arranged to convey the scrap to said combustion means past an oil spray for discharging oil onto the scrap and a water spray for discharging water onto the scrap and means being provided for controlling said sprays.

The combustion means preferably includes a rotary drum through which the scrap passes, and a jacket may be provided around the drum over at least part of the length thereof for the circulation of hot gases around the outside of the drum to supply heat thereto.

The control means may be adapted to control the oil spray and the water spray in dependence on the temperature in the combustion means and the control means may also be adapted to control the supply of hot gases to a jacket around the combustion means.

The feeding means may comprise a scrap supply hopper, the control means including a probe in the hopper for preventing discharge from the oil spray or the water spray when the scrap level in the hopper falls below the probe.

The feeding means may further comprise a conveyor, for example a rotary table, for receiving the scrap from the hopper, the control means being adapted to discontinue discharge from the oil spray or the water spray on stopping of the conveyor.

The control means may comprise an oil timer and a water timer for effecting intermittent feeding of the oil and water to the sprays, the timers preferably being adjustable for varying the frequency and duration of the discharges from the sprays.

The present invention further provides a method of treating metal scrap contaminated with volatile and/or combustible substances, comprising the steps of spraying oil or water onto the contaminated scrap, subsequently effecting at least partial combustion of any combustible substances, and automatically controlling the spraying in dependence on the temperature of a region in which the combustion takes place. The combustion may be effected in the interior of a rotating drum, in which case heat may be supplied to the drum by hot gases circulated round the outside of the drum.

To make the invention more readily understood, two embodiments thereof will now be described by way of example with reference to the accompanying diagrammatic drawings in which:

FIG. 1 shows a side view partly in cross-section of apparatus for treating contaminated scrap;

FIG. 2 shows a part of the apparatus of FIG. 1 with an associated spray control arrangement; and FIG. 3 shows a modification of the spray control arrangement of FIG. 2.

As shown in FIG. 1 a rotary drum indicated generally by reference numeral 10 has an open end provided with a smoke box 12 provided with a removable pocket 14 for the discharge of fine solid particles which have settled out from the gas flow, and an after burner having an elongate chamber 15 with a burner 16, an adjustable secondary air control valve 17, and a stack 18. A steel casing or jacket 20 extends around the drum 10 and is connected to a small furnace 21 for heating the drum 10 and a cooling fan 23 for cooling the drum 10.

A chute 28 is provided for introducing the metal scrap into the rotary drum 10 and is provided with a flap 29 for preventing excessive air ingress, one or more pilot burners 30 being arranged near the chute 28.

In operation of the apparatus, the metal scrap is fed into the rotary drum 10, and evaporation of the water, oil and other volatile and/or combustible substance is effected by burning part of the oil contaminating the scrap, the burning being assisted by the pilot burner 31, and the evaporation being controlled by supplying hot gas from the furnace 21 or cold air from the fan 23 to the jacket 20.

The parts of the apparatus, and their operation, so far described have already been described in the above-mentioned British patent specification No. 944,623 and will therefore not be described herein in greater detail.

For supplying the metal scrap to the chute 29, a scrap supply hopper 31 provided with an adjustable skirt 31a is arranged to discharge on to a rotary conveyor table 32, from which the scrap passes via an oscillatory feed conveyor 33 to the chute 29. The hopper 31 is provided with a probe 34 (FIG. 2) which is arranged to open an electrical contact when the scrap level in the hopper 31 falls below the probe 34.

The scrap on the oscillatory feed conveyor 33 can be sprayed with oil from an oil spray 35 or with water from a water spray 36, depending on the proportions of oil and other organic waste and of water already present in the scrap.

A temperature responsive control unit 37, which is a commercially available Fostronic circular scale indicator/controller, Model No. 3630 manufactured by Foster Instrument Company Limited, of Letchworth, England, is arranged to control the opening and closing of a plurality of electrical contacts in dependence on the temperature within the drum, and a three-way electrical selector switch 38 is provided to enable the apparatus to be prepared for spraying oil or water or neither.

When no spraying is required, the three-way selector switch 38 is moved to an "off" position.

When the scrap has a low content, or no content, of oil or other organic waste, the three-way selector switch 38 is adjusted to an "oil" position to connect an adjustable oil timer TO to a source of electrical energy. Starting from cold, the drum jacket is heated by means of the furnace 21, which is fully on. The probe 34 effects energization and closure of a relay R1 when the scrap level in the hopper 31 is above the probe 34. When a contact A in the control unit 37 closes, a further relay R2 closes and causes the feed table 32 to rotate. The control unit 37 closes this contact A in response to rising of the temperature in the drum, and thereby feeds electrical current through the armatures of the relays R1 and R2 and a normally-closed relay R3 to operate a magnetically operable valve VO under the control of the timer TO connected between the valve VO and the three-way selector switch 38. Since the quantity of oil which has to be sprayed is so small that very fine spray openings would have to be provided if the spraying were continuous, and since the use of very fine spray openings would cause a risk of blockage of these openings and the possible formation of an oil mist, which might be explosive and might be blown away by draughts, the timer TO, which is adjustable, is employed to ensure that the valve VO operates intermittently. The operation of the valve VO and the timer TO causes a coarse intermittent spray from the oil spray 35 onto the scrap on the oscillatory feed conveyor 33.

This oil spraying continues and as the temperature in the drum rises the control unit 37 first initiates reduction of the flame of the furnace 21 at temperature C and then turning off of this flame at temperature D.

At temperature E, the control unit 37 closes a further contact to energise and open the normally-closed relay R3, which interrupts the flow of current to the valve VO and thereby discontinues the oil spraying.

When the temperature again falls below temperature E, the relay R3 is de-energised and the oil spray is re-started, so that the drum temperature is maintained at approximately the temperature E. If the quantity of the oil spray is too small, the drum temperature will fall to temperature D, causing the furnace 21 to be re-ignited on a low flame. By adjusting the timer TO the amount of oil spray can be adjusted to avoid too frequent re-ignition of the furnace 21.

If the water content of the scrap is too low, the three-way selector switch 38 is adjusted to a "water" position, and when the drum temperature reaches a temperature B, provided that the scrap level to the hopper 31 is above the probe 34 and the table 32 is rotating (i.e. that relays R1 and R2 are closed), the control unit 37 effects energization and closure of a normally-open relay R4, and electrical current is supplied via the armatures of the relays R1, R2 and R4 and to open a magnetically operable valve VW controlling the supply of water to the water spray nozzle 36.

The quantity of water should be adjusted by means of timer TW to cause the actual drum temperature to be slightly above the pre-set operating temperature D, at which temperature the burner goes off, in order to prevent simultaneous heating by the furnace 21 and cooling by the water spray.

If the quantity of water is too high, the drum temperature falls and the furnace 21 is re-ignited at temperature D and turned onto full flame at temperature C. The water spray is stopped by de-energization of the relay R4 if the drum temperature falls below temperature B.

If the quantity of water is insufficient and the drum temperature reaches a maximum operating temperature F, the scrap feed and the burner are cut off to protect the apparatus and the scrap from overheating.

The timers TO and TW each comprise a pair of commercially available reset relay timers Type DP11 supplied by Ether Instruments Limited, of Stevenage, England, one of which controls time on and the other of which controls time off.

Means (not shown) are provided for preventing rotation of the table 32 until the drum temperature has reached temperature A, thus preventing charging of the drum while the drum is too cold.

The relays R1 and R2 prevent oil or water being fed without scrap into the drum.

If the arrangement illustrated in FIG. 3 in which parts which are the same as those of FIG. 2 are indicated by the same reference letters and numerals, the three-way selector switch 38, the timers TO and TW and the relays R3 and R4 are omitted. Two proportional temperature controllers CO and CW are provided, which via amplifiers AO and AW control motor operated valves MVO and MVW, the valve MVO controlling the flow of oil through the oil spray 35 and the valve MVW controlling the flow of water through the water spray 36.

The proportional temperature controllers CO and CW operate in response to the temperature in the drum, which is sensed by thermocouples THO and THW connected to the proportional temperature controllers CO and CW.

These proportional temperature controllers are commercially available Potentiometric Temperature Indicating Controller Type 12/97 with Automanual Stations Type 12–99 and the valves MVO and MVW are Billman motorized valves Type V2 AAG/MEV643, all supplied by Ether Instruments Limited, Stevenage, England.

In operation of this arrangement for controlling the oil spray the required operational temperature T1 for the interior of the rotary drum is pre-set on the proportional temperature controller CO, which then adjusts the setting of the motor operator valve MVO, via the amplifier AO, in dependence on the difference between the actual drum temperature T2 and the pre-set required operational temperature T1. The opening of the valve MVO is proportional to this temperature difference, and as the drum temperature increases and the temperature difference decreases, the valve MVO closes proportionately until, when the actual drum temperature T2 is equal to the pre-set required operating temperature T1 the valve MVO closes completely. If the actual drum temperature T2 then drops below the pre-set operating temperature T1, the valve MVO again opens by an amount proportional to the temperature difference.

For controlling the water spray, the proportional temperature controller CW is pre-set to the required operational temperature T1 and, via the amplifier AW, adjusts the setting of the motor operated valve MVW in dependence on the difference between the pre-set required operational temperature T1 and the actual drum temperature T2, the valve MVW being opened in proportion to this temperature difference as the actual drum temperature T2 increases above the pre-set required operating temperature T1 and being closed when the actual drum temperature T2 falls and becomes equal to the pre-set required operating temperature T1.

The arrangement shown in FIG. 3 is automatic, the selection of the spray and the amount thereof being determined by the actual drum temperature T2.

The relays R1 and R2 and the magnetic valves VO and VW prevent either of the sprays from coming into action while either the rotary conveyor table 32 is stationary or the scrap level in the hopper 31 is below the level of the probe 34, as in both of these situations no scrap is being charged into the rotary drum. The magnetic valves VO and VW, when closed, act as shut-off valves irrespective of the settings of the motor-driven valves MVO and MVW.

The provision of the two kinds of spray, i.e. oil spray and water spray, allows the treatment of the scrap in such a way that the scrap is self-sufficient in heat supply, and allows a constant throughput irrespective of the oil and water content of the scrap before reaching the sprays.

The small furnace 21 and the heating jacket 20 which surrounds the drum 10 over at least a part of the length thereof and which serves to preheat the drum 10 when statring from cold may be omitted. In this case, the preheating of the drum 10 may be effected by two gas or oil burners extending through the smoke box 12 into the rotary drum, these burners being shut off or turned down to act as pilot burners when the drum temperature reaches a predetermined minimum temperature at which the contact A closes. By heat insulating the rotary drum 10 directly, instead of the jacket 20, a more efficient heat insulation is obtained as there is no air gap corresponding to that which exists between the jacket and the rotary drum 10 when the jacket 20 is used.

The provision of heat insulation of the rotary drum 10, or on the jacket 20 when provided, is made possible since by the use of the water spray for controlling the drum temperature when the scrap has a high oil content, excess heat does not have to be dissipated from the surface of the drum 10 or the jacket 20. The heat insulation enables heat economy when treating scrap having a low oil content to which oil has to be added, since the heat insulation reduces heat losses and thus enables fuel to be saved. Moreover, heat from the combustion of oil added to the swarf is transferred directly tó the swarf, whereas heat derived from combustion of oil in the heating jacket 20 is transferred indirectly, and therefore less efficiently, to the swarf.

We claim:

1. In an apparatus for treating contaminated scrap metal having a rotatable drum, means for feeding scrap into said drum, means for creating a gas flow through the drum and means for effecting at least a partial combustion of the contaminates, the improvement comprising: conveying means to move the scrap to said feeding means, an oil spray means, a water spray means, both said spray means positioned to discharge onto the scrap on the conveying means, control means to selectively activate said oil spray means upon a predetermined decrease of the temperature of said drum and said water spray means upon a predetermined increase of the temperature of said drum to maintain the combustion at a substantially uniform rate.

2. The apparatus of claim 1, including a scrap supply hopper and the control means has a probe in the hopper to sense the scrap level therein and prevent discharge of said spray means when the level falls below a predetermined amount.

3. The apparatus of claim 2, wherein the conveyor means includes a rotary table for receiving scrap from the hopper and the control means is connected to discontinue the discharge of the spray means when the conveyor stops.

4. The apparatus of claim 1, wherein the control means includes a timer mechanism on said spray means to effect intermittent feeding of said sprays.

5. The apparatus of claim 4, wherein the timer mechanism is connected to vary the frequency and duration of said spray discharge.

6. The apparatus of claim 1, wherein the control means includes at least one proportional temperature controller connected to regulate said spray means in dependence upon the difference between temperature required to maintain said substantially uniform rate of combustion and the actual temperature of said drum.

7. The apparatus of claim 6, wherein the proportional temperature controller is adjustable to preset the required drum temperature.

8. A method of treating metal scrap to remove combustible contaminates therefrom comprising:
   (a) heating said scrap to a temperature range having a lower limit above the flash point of the contaminates and an upper limit below the oxidation or melting point of the metal;
   (b) maintaining the temperature within said range primarily by combustion of the contaminates by selectively:
      (1) spraying a combustible liquid onto said scrap, prior to heating, when the temperature approaches said lower limit;
      (2) spraying water onto said scrap, prior to heating, when the temperature approaches said upper limit;
      (3) withholding spraying when the temperature is substantially even and within said range;
   (c) maintaining a substantially uniform rate of scrap flow during said heating.

References Cited

UNITED STATES PATENTS

| 2,273,126 | 2/1942 | McGillin | 134—57 |
| 2,851,042 | 9/1958 | Spence | 134—57 |
| 2,852,418 | 9/1958 | MacDonald | 134—2 |
| 3,085,582 | 4/1963 | Slosman et al. | 134—57 |
| 3,089,791 | 5/1963 | Stirling et al. | 134—57 XR |
| 3,092,882 | 6/1963 | Dietert | 134—57 XR |
| 3,346,417 | 10/1967 | Ehrlich | 134—2 |

MORRIS O. WOLK, Primary Examiner

J. T. ZATARGA, Assistant Examiner

U.S. Cl. X.R.

29—403; 134—19, 25, 57